United States Patent Office 3,840,605
Patented Oct. 8, 1974

3,840,605
PREPARATION OF ETHERS
Ronnie D. Gordon, Richardson, Tex., assignor to
Continental Oil Company, Ponca City, Okla.
No Drawing. Filed Apr. 3, 1972, Ser. No. 240,847
Int. Cl. C07c 41/10
U.S. Cl. 260—614 R                                16 Claims

ABSTRACT OF THE DISCLOSURE

Ethers are prepared by reacting a halogenated hydrocarbon with an alcohol in the presence of a catalytic amount of an organic quaternary salt, removing the hydrohalic acid formed, and, if necessary, recovering the desired ether by distillation. Typical examples of materials used are: butyl bromide, ethyl alcohol and tributyloctadecylphosphonium bromide. The ethers are useful as solvents.

Background and Field of the Invention

Ethers are particularly useful as solvents. Since the boiling points of ethers differ according to the composition, it is desirable to have available ethers of varying compositions in order to meet a variety of boiling point requirements for solvents.

Industrially, symmetrical ethers have been prepared by sulfuric acid dehydration of alcohols.

Both symmetrical and unsymmetrical ethers can be prepared by the Williamson synthesis wherein an alcohol is first converted to the sodium alkoxide, which in turn is reacted with an alkyl halide to produce the desired ether.

The present invention provides a simple, direct method of preparing a wide variety of ethers, both symmetrical and unsymmetrical.

Prior Art

From a search of the prior art, the following references are considered to be the most pertinent and/or typical of the prior art.

U.S. Pat. No. 1,459,177 teaches the preparation of normal and mixed ethers by the reaction of halogenated aliphatic hydrocarbons on alkalies in solution in aliphatic alcohols.

U.S. Pat. No. 2,042,219 teaches the preparation of unsaturated ethers by reacting, under alkaline conditions in the initial presence of water, an unsaturated organic halide e.g., allyl chloride) and an organic hydroxy compound (e.g., ether alcohol).

U.S. Pat. No. 2,153,513 teaches the preparation of complex ethers by reacting 2-methyl-1,3-dichloropropane with an alcohol and a basic alkali metal compound.

Briefly, the references produced by the search are not pertinent to the process of my invention since: (1) they teach that alkaline conditions are necessary, and (2) they do not suggest the preparation of ethers by my process as described herein.

Brief Summary of the Invention

Broadly stated, my invention is directed to a process for preparing ethers by reacting a halogenated hydrocarbon with an alcohol at a reaction-promoting temperature in the presence of a catalytic amount of an organic quaternary salt, removing the hydrohalic acid formed and recovering the desired ether.

An important feature of the process is the use of the quaternary salt, which will be described in detail hereinafter.

Another significant feature of the process is that it does not require the presence of an alkali. Stated another way, the process is conducted under non-alkaline conditions.

Detailed Description

Materials used and amounts of materials used

Suitable halogenated hydrocarbons include the following:

(a) Primary n-alkyl halides represented by the formula RX wherein R is a $C_1$ to $C_{18}$ normal alkyl group and X is a halogen, which preferably is chloride or bromide. Specific examples include methyl chloride, methyl bromide, butyl chloride, butyl bromide, butyl iodide, hexyl chloride, hexyl bromide, octyl chloride, decyl bromide, dodecyl iodide, tridecyl chloride, tetradecyl bromide, hexadecyl chloride, octadecyl chloride and octadecyl bromide.

(b) Dihaloalkanes represented by the formula $$X(CH_2)_nX$$

wherein X is a halogen, preferably chlorine or bromine, and $n$ is an integer of 1 to 20. Specific examples include dichloroethane, dibromopropane, dichlorobutane, dichlorooctane, dibromododecane, dichlorohexadecane, dibromooctadecane, and dichloroeicosane (c) Internally substituted mono-, di-, and polychlorinated or brominated alkanes containing 4 to 40 carbon atoms Preferably, the chlorinated alkanes are mono- or di-substituted. Specific examples include 2-chlorobutane, 2,4-dichloropentane, 2-chlorohexane, 2,6-dichlorooctane, 2,18-dichloroeicosane, 2,6,18 - trichloroeicosane, 2,28-dichlorotriacontane, 2,20,28-trichlorotriacontane, 2,38-dibromotetracontane, 2,38-dichlorotetracontane, and 2,20,38-trichlorotetracontane.

(d) Unsaturated alkyl halides containing 3 to 40 carbon atoms, such as 1-chloro-3-propene, 1,4-dichloro-2-butene, 2,6-dichloro-4-octene, 2,8-dichloro-6-decene, 2,18-dichloro-10-eicosene, 2,18-dibromo-10-eicosene, 2,28-dichloro-20-triacontene, 2,34-dibromo-4-dotriacontene, 4-chloro-1-triacontene, and 2,38-dibromo-10-tetracontene.

(e) Mono- and di-chloro - substituted monocyclic aromatic compounds, such as benzyl chloride and $\alpha,\alpha'$-dichlorooxylene.

Of the foregoing halogenated hydrocarbons, the aliphatic halogenated hydrocarbons containing from 1 to 40 carbon atoms, wherein the halogen is chlorine or bromine, are more suitable, with the n-alkyl chlorides and n-alkyl bromides being preferred.

Suitable alcohols include the following:

(a) Primary, secondary and tertiary aliphatic monohydroxy alcohols containing 1 to 40 carbon atoms, preferably 1 to 20 carbon atoms, and more preferably 1 to 10 carbon atoms. Specific examples include ethanol, n-butanol, n-octanol, n-eicosanol, n-triacontanol, n-tetracontanol, sec-butanol, sec-decanol, sec-eicosanol, t-butanol, t-octanol, t-hexanol, t-eicosanol, sec-triacontanol, t-triacontanol, sec-tetracontanol and t-tetracontanol (b) Monocyclic, aryl-substituted monohydroxy alcohols, wherein the alcohol moiety contains 4 to 20 carbon atoms, such as 3-phenyl butanol, 4-phenyl hexanol, 5-phenyl octanol, 3-phenyl decanol, 6-phenyl dodecanol, 8-phenyl hexadecanol, 10-phenyl octadecanol and 12-phenyl eicosanol.

(c) Alkyl-substituted aromatic alcohols, represented by the formula

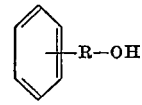

wherein R is a straight or branched chain alkyl group containing 2 to 10 carbon atoms, such as benzyl alcohol (i.e., 2-phenyl-2-propanol), 2-phenyl-1-butanol, 3-phenyl-1-hexanol, 6-phenyl-1-hexanol, 8-phenyl-1-octanol, 10-phenyl - 1 - decanol, 6-phenyl-1-decanol, 2-phenyl-2-hexanol, 2-phenyl-2-octanol, and 2-methyl-2-phenyl-1-butanol.

(d) Polyhydroxy alcohols, containing 2 or 3 hydroxy groups and 2 to 10 carbon atoms, such as ethylene glycol, propylene glycol, and glycerol, 1,2-butanediol, 1,3-hexanediol, 1,3-octanediol, 1,8-decanediol, ,3,5-heptanetriol and 1,4,8-decanetriol.

(e) Alkoxy-substituted alcohols represented by the formula $ROCH_2CH_2OH$ wherein R is a $C_1$ to $C_6$ alkyl group. Examples of this type of alcohol include methoxy ethanol, ethoxy ethanol, butoxy ethanol, pentoxy ethanol and hexoxy ethanol.

The more suitable alcohols for use in my process are the aliphatic monohydroxy alcohols, i.e. alkanols containing 1 to 40 carbon atoms. Of these, the primary alcohols containing 1 to 10 carbon atoms are preferred.

While it is suitable to use stoichiometric amounts of the alcohol and the halogenated hydrocarbon (i.e., a 1:1 mole ratio when a monohydroxy alcohol and a monohalogenated hydrocarbon are used) preferably an excess of alcohol is used which can be in the range of 2 to 5 times the stoichiometric amount.

Suitable organic quaternary salts, which are used as a catalyst in my invention, have the general formula

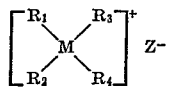

wherein M is a pentavalent ion of an element selected from the group consisting of nitrogen, phosphorus, arsenic, antimony and bismuth; $R_1$, $R_2$, $R_3$, and $R_4$ are alkyl groups containing from 1 to about 30 carbon atoms; and Z is a conventional anion derived from an organic or inorganic acid, including halides, sulfates, sulfonates and acetates. Normally, it is desirable that the alkyl substituents $R_1$, $R_2$, $R_3$ and $R_4$ contain more than a single carbon atom. Examples of suitable organic quaternary salts which can be employed as the catalyst for the exchange reaction described hereinbefore are: hexadecyltrihexylammonium bromide; trioctylethylammonium bromide; tridecylmethylammonium chloride; didodecyldimethylamonium chloride; tetraheptylammonium iodide; dioctadecyldimethyl ammonium chloride; tridecylbenzylammonium chloride; tributyldecylphosphonium iodide; triphenyldecylphosphonium iodide; tributylhexadecylphosphonium iodide; tricapryldodecylammonium p-toluene sulfonate; tribenzyldecylarsonium chloride; tetranonylammonium hydroxide; N,N,N',N' - tetramethyl-N,N'-ditetradecyl-p-xylene-α,α'-diammonium dichloride; 1-methyl-1-(N-octadecanonyl-2-aminoethyl)-2-heptadecyl-4,5-dihydro - 1,3-diazole methylsulfonate; N,N,N',N'-tetramethyl - N,N' - dioctadecyl-x-dodecyl-y-xylene-α,α'-diammonium dichloride.

The preferred organic quaternary salts are thost wherein M is nitrogen or phosphorus and Z is chloride or bromide ion. The most preferred organic quaternary salts are those wherein M is nitrogen and Z is chloride or bromide.

Knowing that the quaternary salts described herein are effective as a catalyst in the process of preparing ethers described herein, any person skilled in the art can readily determine the optimum amount required. In order to make my disclosure more complete, however, I have found a preferred amount of catalyst to be from about 1 to about 5 percent by weight based on the halogenated hydrocarbon. An amount of catalyst as low as about 0.01 weight percent is suitable provided a longer reaction time is not undesirable. Similarly, an amount of catalyst as high as about 20 weight percent is suitable as long as higher costs are not undesirable.

Process conditions

The process can be conducted under either batch or continuous operation, but usually is conducted as a batch operation.

The process can be conducted at a temperature in the range of about 0 to about 300° C., more suitably 10 to 150° C., and preferably 30 to 50° C.

The reaction time is not critical, being dependent on the particular materials used and concentration of catalyst. Accordingly, any person skilled in this art, without undue experimentation, can readily determine the reaction time. However, in order to make my teachings more complete, generally, I have found that the reaction is complete in from about 0.1 to about 36 hours, usually in about 1 to about 5 hours.

The reaction of my process is an equilibrium reaction and can be forced to completion by removal of the hydrohalic acid produced. Usually, the hydrohalic acid is removed by heating the admixture. Of course, it is apparent that other means, usually less economical and convenient, are available to remove the hydrohalic acid.

After removal of the hydrohalic acid, if necessary, the ether is recovered by means of distillation. It is readily apparent that in some instances the reaction admixture has such a minor amount of non-ether materials that distillation is not necessary.

In order to disclose the nature of the present invention more specifically, the following illustrative examples will be given. It is to be understood that the invention is not to be limited to the specific conditions or deatils set forth in these examples except insofar as these limitations are specified in the appended claims.

EXAMPLE 1

This example shows the preparation of ethylbutyl ether.

50 ml. absolute ethanol, 27.4 g. (0.2 mol) butyl bromide, and 0.2 g. tributyloctadecyl phosphonium bromide (catalyst) were sealed in an autoclave and heated at 125–130° C. for three hours. Samples were then taken and analyzed by GLC (gas liquid chromatography). The products were identified by means of mass spectrometry after GLC collection. The reaction product in addition to starting materials contained ethylbutyl ether and ethyl bromide. The major product was ethylbutyl ether with only a trace of ethyl bromide being present. In this particular example, the conversion was about 45% (based upon n-butyl bromide) with a selectivity of 90–95%.

EXAMPLE 2

Ethylbutyl ether is prepared using the materials and reaction conditions of Example 1. After completion of the reaction, the HBr is removed by heating. The ethylbutyl ether is recovered from the reaction product by means of distillation.

EXAMPLE 3

Butyloctyl ether is prepared from octylchloride and n-butanol using as the catalyst trihexyloctadecylammonium chloride. The reaction conditions of Example 1 are used. Following heating to remove the HCl, the butyloctyl ether is recovered from the reaction product by distillation.

EXAMPLE 4

Propyldodecyl ether is prepared from n-propanol and dodecyl bromide using trioctyldodecyl phosphonium bromide as the catalyst. The reaction conditions are similar to those of Example 1. The HBr was removed by heating with the propyldodecyl ether being recovered from the reaction product by distillation.

EXAMPLE 5

Dihexyl ether is prepared from hexyl bromide and n-hexanol using as the catalyst trinonyltetradecyl ammonium bromide. The reaction conditions are similar to those of Example 1. The HBr is removed by heating following which the dihexyl ether is recovered from the reaction product by means of distillation.

Having thus described the invention by providing specific examples thereof, it is to be understood that no undue limitations or restrictions are to be drawn by reason thereof and that many variations and modifications are within the scope of the invention.

The invention having thus been described, what is claimed and desired to be secured by Letters Patent is:

1. A process for preparing ethers wherein the process consists essentially of reacting a chlorinated or brominated alkane containing from 1 to 40 carbon atoms with an alcohol at a reaction-promoting temperature, in the range of about 0 to about 300° C., in the presence of a catalyst consisting essentially of a catalytic amount, in the range of from about 0.01 to about 20 weight percent based on chlorinated or brominated alkane, of an organic quaternary salt, said process being characterized further in that:

(a) said organic quaternary salt is represented by the formula:

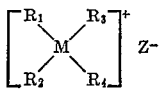

wherein (1) M is a pentavalent ion of an element selected from the group consisting of nitrogen and phosphorus, (2) $R_1$, $R_2$, $R_3$, and $R_4$ are alkyl groups containing from 1 to about 30 carbon atoms, and (3) Z is a chloride or bromide anion, (b) said alcohol is selected from the group consisting of:
  (1) alkanols containing 1 to 40 carbon atoms,
  (2) aryl-substituted monohydroxy alcohols selected from the group consisting of 3-phenyl butanol, 4-phenyl hexanol, 5-phenyl octanol, 3-phenyl decanol, 6-phenyl dodecanol, 8-phenyl hexadecanol, 10-phenyl octadecanol, 12-phenyl eicosanol, 2-phenyl - 2 - propanol, 2-phenyl-1-butanol, 3-phenyl-1-hexanol, 6-phenyl-1-hexanol, 8-phenyl-1-octanol, 10-phenyl-1-decanol, 6-phenyl-1-decanol, 2-phenyl-2-hexanol, 2-phenyl-2-octanol, and 2-methyl-2-phenyl-1-butanol,
  (3) polyhydroxy alcohols selected from the group consisting of ethylene glycol, propylene glycol, glycerol, 1,2-butanediol, 1,3-hexanediol, 1,3-octanediol, 1,8-decanediol, 1,3,5-heptanetriol, and 1,4,8-decanetriol; and
  (4) alkoxy-substituted alcohols represented by the formula $ROCH_2CH_2OH$ wherein R is a $C_1$ to $C_6$ alkyl group.

2. The process of Claim 1 wherein the amount of alcohol based on the chlorinated or brominated alkane, on a stoichiometric basis, is in the range of about 1:1 to about 5:1.

3. The process of Claim 2 wherein the chlorinated or brominated alkane is a primary n-alkyl chloride or bromide wherein the alkyl group contains 1 to 18 carbon atoms.

4. The process of Claim 3 wherein, in the catalyst, M is nitrogen and Z is a chloride anion.

5. The process of Claim 4 wherein the alcohol is an alkanol alcohol containing 1 to 40 carbon atoms.

6. The process of Claim 5 wherein the alkanol contains from 1 to 10 carbon atoms.

7. The process of Claim 3 wherein, in the catalyst, M is phosphorus and Z is a chloride anion.

8. The process of Claim 7 wherein the alcohol is an alkanol containing 1 to 40 carbon atoms.

9. The process of Claim 8 wherein the alkanol contains 1 to 10 carbon atoms.

10. The process of Claim 3 wherein the reaction temperature is in the range of about 10 to about 150° C. and the amount of organic quaternary salt, based on said chlorinated or brominated alkane, is in the range of about 1 to about 5 weight percent.

11. The process of Claim 10 wherein, in the catalyst, M is nitrogen and Z is a chloride anion.

12. The process of Claim 11 wherein the alcohol is an alkanol containing 1 to 40 carbon atoms.

13. The process of Claim 12 wherein the alkanol contains from 1 to 10 carbon atoms.

14. The process of Claim 10 wherein, in the catalyst, M is phosphorus and Z is a chloride anion.

15. The process of Claim 14 wherein the alcohol is an alkanol containing 1 to 40 carbon atoms.

16. The process of Claim 15 wherein the alkanol contains 1 to 10 carbon atoms.

References Cited

UNITED STATES PATENTS

| | | | |
|---|---|---|---|
| 2,153,513 | 4/1939 | Coleman et al. | 260—614 R |
| 1,999,315 | 4/1935 | Baldwin et al. | 260—611 A X |
| 2,237,241 | 4/1941 | Strosacker et al. | 260—614 R X |
| 2,332,467 | 10/1943 | Linn et al. | 260—614 R |
| 2,042,219 | 5/1936 | Groll et al. | 260—614 R |
| 1,459,177 | 6/1923 | Carter et al. | 260—614 R |

FOREIGN PATENTS

| | | | |
|---|---|---|---|
| 1,409,185 | 7/1965 | France | 260—614 |

HOWARD T. MARS, Primary Examiner

U.S. Cl. X.R.

260—611 A, 615 R